United States Patent
Chotoku et al.

(10) Patent No.: US 7,502,952 B2
(45) Date of Patent: *Mar. 10, 2009

(54) METHOD AND APPARATUS FOR THERMAL CONTROL OF ELECTRONIC COMPONENTS

(75) Inventors: Yuji Chotoku, Kawasaki (JP); Rieko Kataoka, Sagamihara (JP); Takayuki Katoh, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/776,237

(22) Filed: Jul. 11, 2007

(65) Prior Publication Data

US 2007/0252544 A1 Nov. 1, 2007

Related U.S. Application Data

(63) Continuation of application No. 10/975,232, filed on Oct. 28, 2004, now Pat. No. 7,343,505.

(51) Int. Cl.
*G06F 1/26* (2006.01)
*G06F 1/00* (2006.01)

(52) U.S. Cl. .................. 713/340; 713/300; 713/320; 713/322; 700/151; 700/153; 361/687; 361/695

(58) Field of Classification Search .................. 713/340
See application file for complete search history.

(56) References Cited

U.S. PATENT DOCUMENTS

| | | | |
|---|---|---|---|
| 5,526,289 A * | 6/1996 | Dinh et al. ................. 700/300 |
| 6,247,898 B1 * | 6/2001 | Henderson et al. ............. 417/3 |
| 6,340,874 B1 | 1/2002 | Vladimir | |
| 6,643,128 B2 | 11/2003 | Chu et al. | |
| 6,809,538 B1 | 10/2004 | Borkar | |
| 6,987,370 B2 | 1/2006 | Chheda et al. | |
| 7,111,178 B2 | 9/2006 | Rusu et al. | |
| 7,293,186 B2 * | 11/2007 | Thomas et al. .............. 713/322 |
| 2002/0065049 A1 | 5/2002 | Chauvel et al. | |
| 2004/0128101 A1 | 7/2004 | Hermerding, II | |
| 2005/0094329 A1 | 5/2005 | Broyles | |
| 2005/0097371 A1 | 5/2005 | Broyles | |
| 2005/0216245 A1 | 9/2005 | Hobson | |

FOREIGN PATENT DOCUMENTS

| | | |
|---|---|---|
| JP | 11-184566 A | 7/1999 |
| JP | 2000349477 A | 12/2000 |
| JP | 2001125682 A | 5/2001 |

* cited by examiner

*Primary Examiner*—Nitin C Patel
(74) *Attorney, Agent, or Firm*—Lieberman & Brandsdorfer, LLC

(57) ABSTRACT

A method and system are provided for thermal management of a CPU. Both hardware and software data are used to periodically calculate a power consumption index. An internal database is provided to convert power consumption data to rotational speed of an associated cooling fan for the CPU. Based upon a change in the calculated power consumption, the rotational speed of the fan may be adjusted to accommodate the change in power consumption. Accordingly, the method and system monitors and adjusts the rotational speed of the cooling fan based upon available hardware and software data.

16 Claims, 2 Drawing Sheets

METHOD AND APPARATUS FOR THERMAL CONTROL OF ELECTRONIC COMPONENTS

CROSS REFERENCE TO RELATED APPLICATION(S)

The present application is a continuation of U.S. patent application Ser. No. 10/975,232 filed Oct. 28, 2004, now U.S. Pat. No. 7,343,505, and is hereby incorporated by reference.

BACKGROUND OF THE INVENTION

1. Technical Field

This invention relates to maintaining an optimal fan rotation speed for a CPU. More specifically, both hardware and software measurements are used in determining the optimal fan rotation speed.

2. Description of the Prior Art

Electronic equipment produces an excess thermal output, that, if not properly controlled and directed away from the equipment will affect operation and performance of the equipment. There are many different methods and appliances for dissipating heat from electronic equipment. For example, heat sink apparatus are attached to or positioned to rest upon a processor and to passively dissipate heat byproduct from the adjacent processor. There is an abundant quantity of heat sink apparatus available in which different fin structures of the heat sink may affect the heat dissipating abilities of the heat sink. Some heat sink apparatus passively dissipate heat, and others actively dissipate heat by use of a fan or similar mechanism. The fan speed associated with the fan adjacent to the heat sink may be static, or in some cases may be dynamic. In the case of a dynamic fan speed, the speed of the fan is adjusted based upon temperature sensor data. However, as processor frequencies increase so does the excess thermal output from the processor. A passive heat sink may not sufficiently be able to effectively dissipate heat. Similarly, an active heat sink may be able to dissipate the heat if it could adjust the fan speed based upon accurate and current data. Accordingly, there is a need for control of rotational speed of a fan(s) used to dissipate heat from electronic equipment based upon accurate, current, and appropriate data.

Two known solutions are illustrated in Japanese Publication No. 2000-349477 to Gohei and Japanese Abstract 11-184566 to Tsukasa et al. In both Gohei and Tsukasa et al., the objective is to attain a response corresponding to fan speed that is more sensitive than temperature data. An ammeter is used in both Gohei and Tsukasa et al. to obtain power consumption data, where the power consumption data is directly converted to a corresponding fan speed. However, there are drawbacks with use of the ammeter for addressing thermal output. One such drawback is that the use of power consumption data to control fan speed results in hyper sensitive readings which produce rapid changes in fan speed control which increases noise associated with frequent fan speed adjustments. Another drawback associated with use of an ammeter includes the requirement for an additional hardware component that in itself has a thermal output. The ammeter is a contributing factor to the corresponding fan speed. Accordingly, the prior art provides a solution to controlling fan speed that has limitations associated therewith.

There is therefore a need to provide optimum control of excess thermal output from electronic equipment that does not require an additional hardware component.

SUMMARY OF THE INVENTION

This invention comprises a method and system for controlling thermal output from heat producing equipment.

In one aspect of the invention, a method is provided for cooling a computer. Thermal data is obtained for a central processing unit, CPU, stored in a hardware register, and from an operating system associated with the CPU. A power consumption index is calculated based upon the obtained hardware and software data. Thermal output of the CPU is controlled by determining an optimum fan speed based upon the calculated power consumption index. The fan speed is adjusted in response to changes in the power consumption index.

In another aspect of the invention, a system is provided with a CPU in communication with a hardware register. First thermal data is obtained from the hardware register. In addition, second thermal data is obtained from an operating system in communication with the CPU. A power consumption index is calculated based upon the first thermal data and the second thermal data. Thermal output of the CPU is calculated by a determination of an optimum fan speed based upon the calculated power consumption index. A manager adjusts the fan speed in response to changes in the power consumption index.

In yet another aspect of the invention, an article is provided with a computer-readable medium having instructions to cool a computer. The instructions include instructions to obtain thermal data for a central processing unit, CPU, stored in a hardware register, and instructions to obtain thermal data from an operating system associated with the CPU. Instructions are also provided to calculate a power consumption index based upon the thermal data obtained from both the hardware register and the operating system. Thermal output is controlled through instructions to determine an optimum fan speed based upon the calculated power consumption index. Instructions are provided to adjust the fan speed in response to changes in the power consumption index.

Other features and advantages of this invention will become apparent from the following detailed description of the presently preferred embodiment of the invention, taken in conjunction with the accompanying drawings.

DESCRIPTION OF THE PREFERRED EMBODIMENT

Overview

A power consumption index is calculated based upon hardware data stored in model specific registers, and software data provided by the operating system of a CPU. The power consumption index accounts for leakage current associated with the electronics that comprise the CPU. An internal database is consulted to convert the calculated power consumption index to an appropriate fan speed rotation. Based upon an internal algorithm, the fan speed rotation may be periodically adjusted to accommodate changes in the power consumption index.

Technical Details

Figure 1:
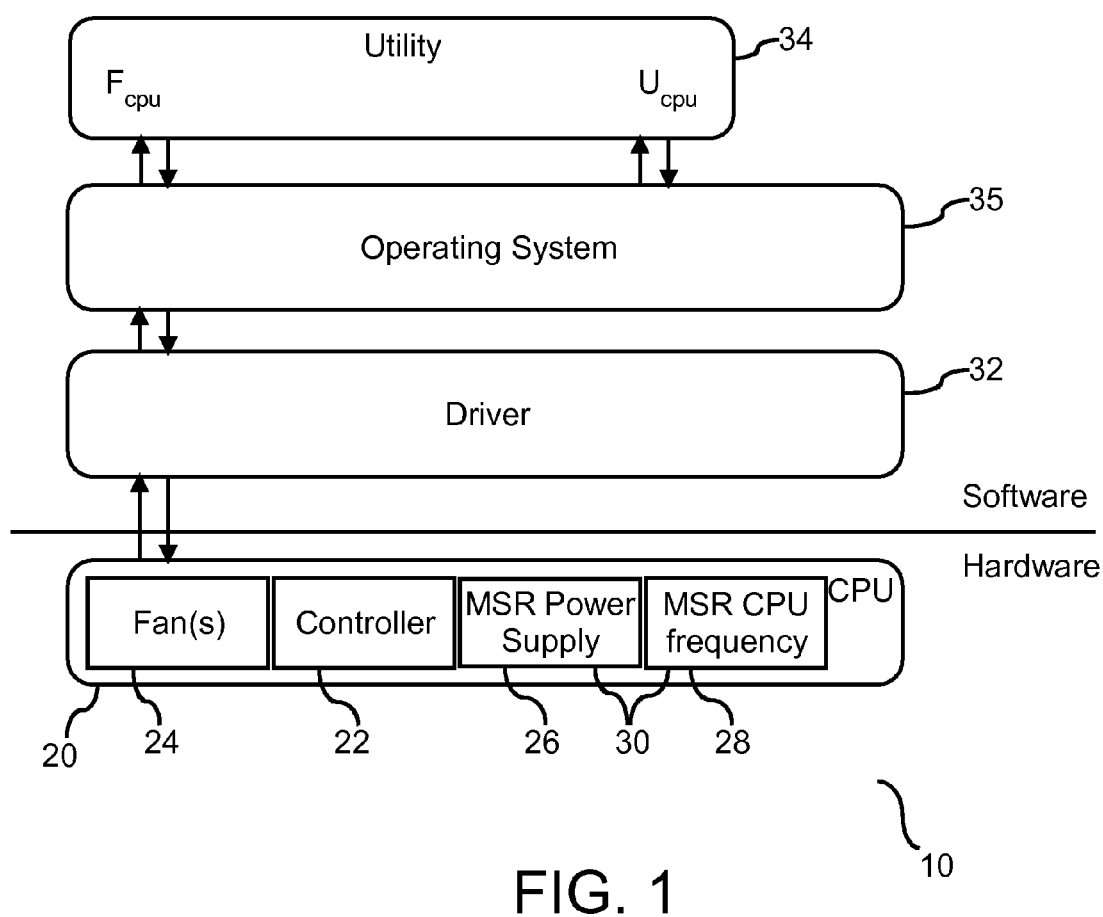
FIG. 1 is a block diagram of a CPU according to the preferred embodiment of this invention, and is suggested for printing on the first page of the issued patent.

Each CPU has hardware registers that function as high speed memory locations. FIG. 1 is a block diagram (10) illustrating a CPU (20) having an embedded controller (22), model specific registers (30), and one or more fans (24). The CPU (20) has several model specific registers for storing internal CPU data, including a power supply register (26) and a CPU operating frequency register (28). The power supply register (26) stores data pertaining to the voltage of the CPU, and the CPU operating frequency register (28) stores data pertaining to the speed of the associated processor(s). The controller (22) adjusts the rotational speed of the fan(s) (24) in response to changes in an associated power consumption index of the CPU (10). In addition, the controller (22) has the ability to cause an interrupt to the CPU if the thermal output becomes excessive.

The operating frequency of the CPU has a corresponding CPU power supply voltage. As such, the power supply voltage of the CPU is determined based upon operating frequency data of the CPU obtaining from the CPU operating frequency register (28). There are three factors required to calculate the power consumption index of a CPU (P), the CPU power supply voltage ($V_{core}$), the operating frequency of the CPU ($F_{CPU}$), and the CPU usage ratio ($U_{CPU}$). The following formula provides the power consumption index:

$$P=(A)(V_{core}^2)(F_{CPU})(U_{CPU}),$$

where A is a constant. As noted above, both the CPU operating frequency and the CPU power supply voltage are related elements where the frequency data is obtained from a model specific register (28). The CPU usage ratio, $U_{CPU}$, is a factor that is obtained from the operating system (35). A utility (34) periodically gathers data from the model specific registers (26) and (28) to periodically calculate the power consumption index. The power consumption index is directly related to an optimal fan speed rotation. Once the power consumption index has been calculated, an optimal fan speed rotation is obtained from an internal database table (not shown) that stores a corresponding fan speed for a calculated power consumption index. A driver (32) communicates with the embedded controller (22) to adjust or maintain the rotational fan speed based upon the calculated power consumption index. Accordingly, thermal output of the CPU is controlled by use of registers and operating system data.

Figure 2:
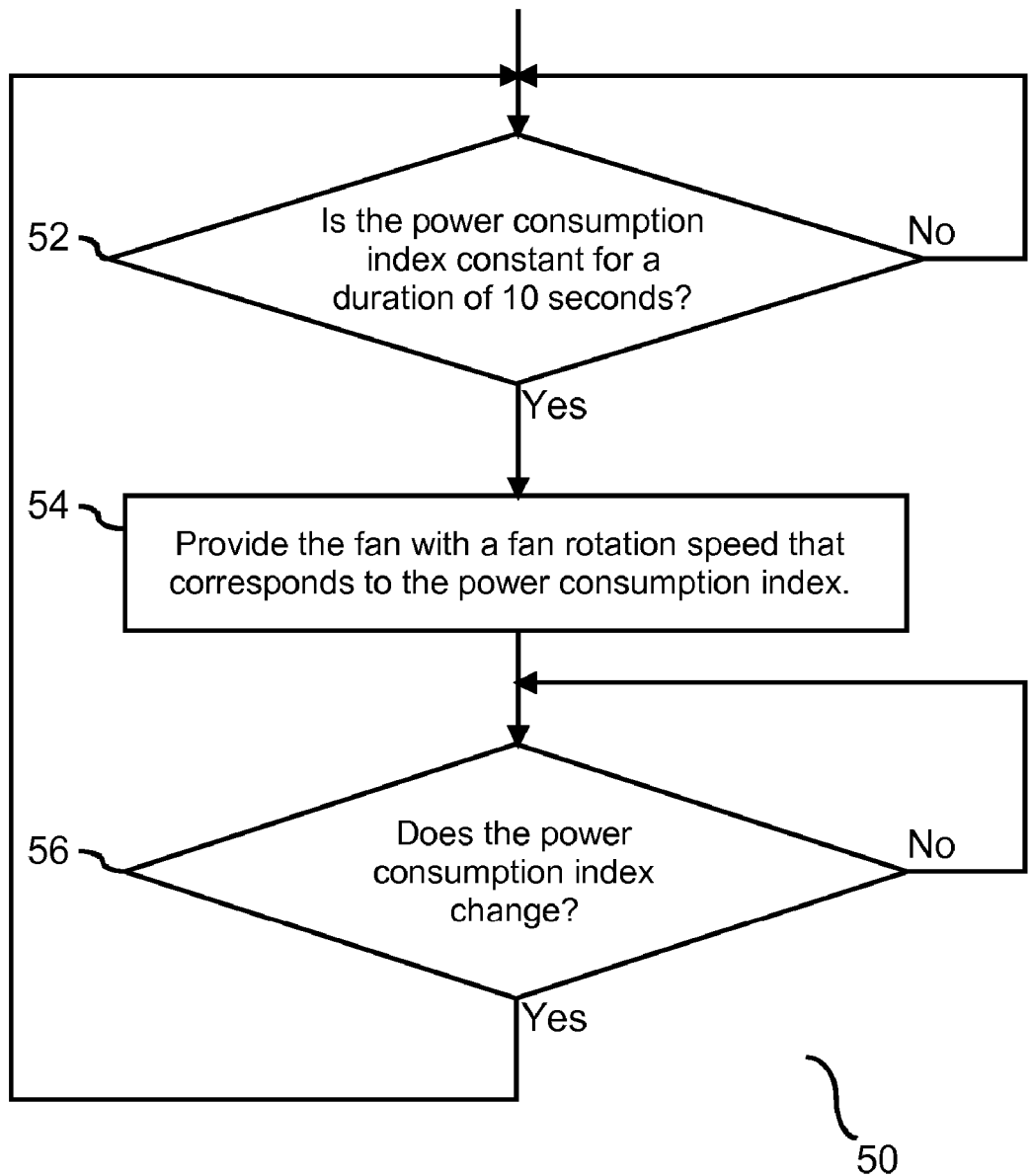
FIG. 2 is a flow chart illustrating control of fan speed.

Thermal management uses the power consumption index to adjust the rotational speed of the fans used to cool the CPU. FIG. 2 is a flow chart (50) illustrating one method for controlling rotational speed of the fan(s). In this flow chart (50), the power consumption index is utilized to prevent an unnecessary increase in an enclosure temperature and power consumption when a software program having a constant loading level is continuously executed. An initial test is conducted to determine if the power consumption index has been constant for a duration of ten seconds (52). Although the time interval shown herein is ten seconds, the time interval can be adjusted to a smaller or larger time interval. A positive response to the test at step (52) will result in setting the fan or fans with a rotational speed that corresponds to the power consumption index (54). However, a negative response to the test at step (52) will result in a return to the test at step (52) to repeat the inquiry. Following the assignment of fan rotation at step (54), a subsequent test is conducted to determine if there has been a change in the most recent reading of the power consumption index (56). A positive response to the test at step (56) will result in a return to step (56). Similarly, a negative response to the test at step (56) will result in a return to step (56). Accordingly, as shown herein the power consumption index can be periodically monitoring and the fan speed periodically adjusted based upon changes in the power consumption index.

Advantages Over the Prior Art

The power consumption index accounts for current leakage from the CPU, or electronic equipment associated with the CPU. There is no requirement for additional hardware elements to accurately determine an optimal fan speed rotation in order to achieve an appropriate temperature for operation of the CPU. The power consumption index changes as the speed of the processor changes. If there is a change in the power consumption index that requires a different fan speed rotation, the rotational speed of one or more fans is adjusted to accommodate the changed power consumption index. Accordingly, the rotational speed of one or more fans is maintained and/or adjusted based upon a periodic calculation of the power consumption index and comparison of the calculated index with the optimal fan speed rotation.

Alternative Embodiments

It will be appreciated that, although specific embodiments of the invention have been described herein for purposes of illustration, various modifications may be made without departing from the spirit and scope of the invention. In particular, the algorithm used to periodically calculate the power consumption index may be modified to increase or decrease the frequency of the calculations. Similarly, the fan speed control may be modified to only change speeds when there has been a significant change in the determined operating frequency of the fan(s). This may contribute to reducing noise associated with changes in the fan speed. Accordingly, the scope of protection of this invention is limited only by the following claims and their equivalents.

We claim:

1. A method for cooling a computer comprising:
   obtaining thermal data for a central processing unit, CPU, stored in a hardware register, and obtaining a CPU usage ratio from an operating system associated with the CPU;
   obtaining additional thermal hardware data from CPU power supply voltage and CPU operating frequency;
   calculating a power consumption index based upon said obtained thermal data and said CPU usage ratio;
   controlling thermal output of the CPU by determining an optimum fan speed based upon said calculated power consumption index; and
   adjusting said fan speed in response to changes in said power consumption index.

2. The method of claim 1, wherein said power consumption index based is calculated based upon the following mathematical relationship: $P=(A)(V_{core}^2)(F_{CPU})(U_{CPU})$, where A is a constant, $V_{CORE}$ is a CPU power supply voltage, $F_{CPU}$ is a CPU operating frequency, and $U_{CPU}$ is the usage ratio of the CPU obtained from the operating system of the CPU.

3. The method of claim 1, wherein said CPU power supply voltage is determined by said CPU operating frequency.

4. The method of claim 1, wherein the step of determining an optimum fan speed includes converting said power consumption index to an optimum fan speed rotation.

5. The method of claim 1, further comprising consulting an internal database having a conversion table of said power consumption index and said optimum fan speed rotation.

6. A system comprising:
a central processing unit, (CPU) in communication with a hardware register;
first thermal data obtained from said hardware register;
an operating system in communication with said CPU;
a CPU usage ratio obtained from said operating system;
a power consumption index calculated based upon said first thermal data, and said CPU usage ratio;
thermal output of said CPU calculated by a determination of an optimum fan speed based upon said calculated power consumption index; and
a manager to adjust said fan speed responsive to changes in said power consumption index.

7. The system of claim 6, wherein said power consumption is calculated based upon the following mathematical relationship: $P=(A)(V_{core}^2)(F_{CPU})(U_{CPU})$, where A is a constant, $V_{CORE}$ is a CPU power supply voltage, $F_{CPU}$ is a CPU operating frequency, and $U_{CPU}$ is the usage ratio of the CPU obtained from the operating system of said CPU.

8. The system of claim 6, further comprising additional thermal hardware data obtained from a CPU power supply voltage and a CPU operating frequency.

9. The system of claim 8, wherein said CPU power supply voltage is determined by said CPU operating frequency.

10. The system of claim 6, wherein said thermal output calculation includes a conversion of said power consumption index to an optimum fan speed rotation.

11. The system of claim 6, further comprising an internal database table adapted to convert said power consumption index to said optimum fan speed.

12. An article comprising:
a computer-readable medium having instructions for cooling a computer, said instructions comprising:
instructions to obtain thermal data for a central processing unit, CPU, stored in a hardware register, and instructions to obtain a CPU usage ratio from an operating system associated with the CPU;
instructions to obtain additional thermal hardware data from CPU power supply voltage and CPU operating frequency;
instruction to calculate a power consumption index based upon said obtained thermal data and said CPU usage ratio;
instructions to control thermal output of the CPU by determining an optimum fan speed based upon said calculated power consumption index; and
instructions to adjust said fan speed in response to changes in said power consumption index.

13. The article of claim 12, wherein said power consumption index is calculated based upon the following mathematical relationship: $P=(A)(V_{core}^2)(F_{CPU})(U_{CPU})$, where A is a constant, $V_{CORE}$ is a CPU power supply voltage, $F_{CPU}$ is a CPU operating frequency, and $U_{CPU}$ is the usage ratio of the CPU obtained from the operating system of the CPU.

14. The article of claim 12, wherein said CPU power supply voltage is determined by said CPU operating frequency.

15. The article of claim 12, wherein the instructions to determine an optimum fan speed includes convening said power consumption index to an optimum fan speed rotation.

16. The article of claim 12, further comprising instructions to consult an internal database having a conversion table of said power consumption index and said optimum fan speed rotation.

* * * * *